United States Patent [19]
Mann

[11] Patent Number: 4,708,120
[45] Date of Patent: Nov. 24, 1987

[54] APPARATUS AND METHOD FOR TREATING AIR FROM A TURBOCHARGER

[75] Inventor: David O. Mann, Hamilton, Ind.

[73] Assignee: Mann Technology Limited Partnership, Greenville, S.C.

[21] Appl. No.: 840,040

[22] Filed: Mar. 17, 1986

[51] Int. Cl.⁴ ............................................. F02B 29/04
[52] U.S. Cl. ..................................... 123/563; 165/32; 165/111
[58] Field of Search ........................ 60/599; 123/563; 165/32, 104.14, 111; 417/243

[56] References Cited

U.S. PATENT DOCUMENTS

| | | | |
|---|---|---|---|
| 2,835,340 | 5/1958 | McGuff et al. ...................... | 62/93 X |
| 4,474,162 | 10/1984 | Mason ................................. | 123/563 |
| 4,474,229 | 10/1984 | Bell ............................ | 165/104.14 X |

FOREIGN PATENT DOCUMENTS

| | | | |
|---|---|---|---|
| 48719 | 4/1977 | Japan ..................................... | 60/599 |
| 28989 | 2/1982 | Japan ..................................... | 165/32 |
| 2018358 | 10/1979 | United Kingdom .................. | 60/599 |

Primary Examiner—Michael Koczo
Attorney, Agent, or Firm—Bailey & Hardaway

[57] ABSTRACT

Heat exchanger apparatus and method for cooling and removing moisture from air passing from a turbocharger (10) and the like to an intake of a combustion engine (11) is illustrated wherein heat pipes (B) extend across a flow path of the compressed air to a zone (C) of ambient air external of the flow path of compressed air to transfer heat to a controlled ambient air flow in the ambient (C) passing across the heat tubes, and including a coalescer zone (D) for collecting and removing moisture from the cooled air.

11 Claims, 3 Drawing Figures

APPARATUS AND METHOD FOR TREATING AIR FROM A TURBOCHARGER

BACKGROUND OF THE INVENTION

This invention relates to the use of apparatus for increasing the supply of compressed air to an engine such as a turbocharger, supercharger and the like. It is desirable to cool such compressed air being introduced into an engine in order to obtain efficient combustion. Unless the air is cooled the engine may tend to become overheated. The use of a coolant is not desirable because it utilizes power from the engine.

Accordingly, it is an important object of the present invention to cool such compressed air being fed into the engine through the use of heat tubes extending from the flow path of heated air into a controlled flow of ambient air. Excess moisture is collected and removed in a coalescer zone.

U.S. Pat. No. 4,033,406 discloses the use of a heat exchanger for use in a cooling tower by the use of heat pipes extending across inlet and outlet housings.

U.S. Pat. No. 3,965,681 and German patent No. 28 21 154 disclose heat pipes used in conjunction with turbochargers in other configurations.

SUMMARY OF THE INVENTION

It has been found that cross over or compressed air may be cooled to a predetermined temperature, and increased moisture which results from such cooling, collects and is removed before the introduction of the cross over air to an engine such as a gasoline engine, a diesel engine or an external combustion engine and the like. The cross over air is passed over heat tubes which extend across the path of the cross over air. The heat tubes extend out of the path of the cross over air and thence into the path of ambient air flow. The amount of ambient air flowing across the heat tubes may be controlled by a sensor carried in the cross over air flow preferably after cooling. The moisture which results from the temperature drop may be collected in a coalescer section which utilizes an abrupt change of direction as well as collecting surfaces for collecting and the expelling of moisture.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
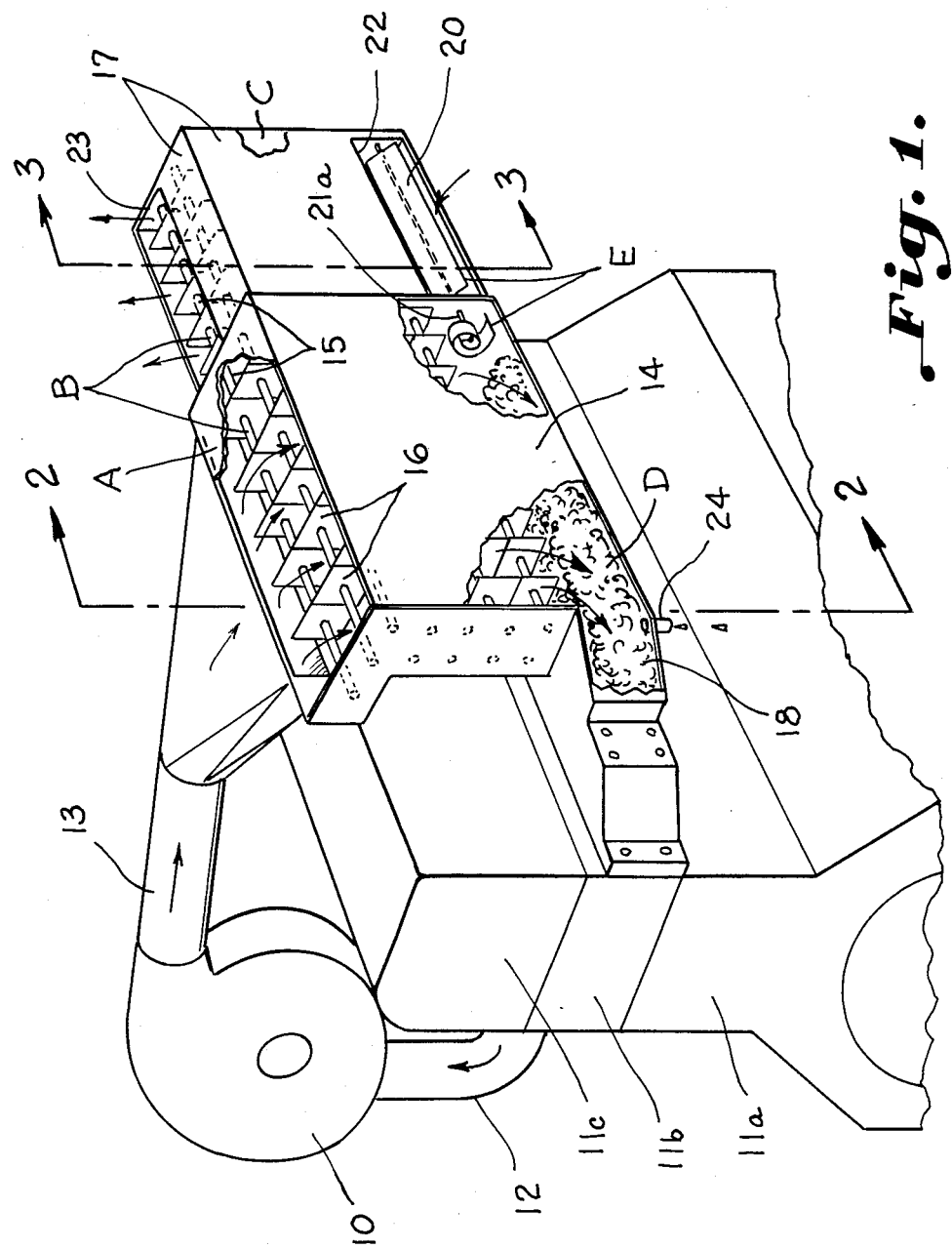
FIG. 1 is a perspective view illustrating an engine having a turbocharger equipped with apparatus for treating cross over air constructed in accordance with the present invention.
Figure 2:
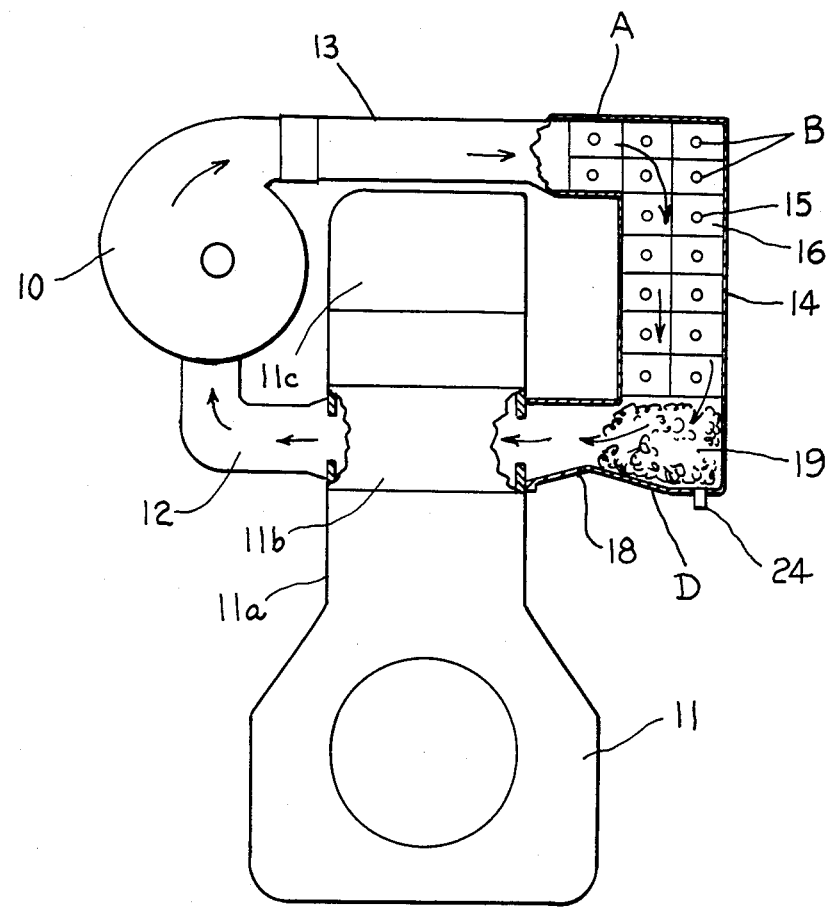
FIG. 2 is a transverse sectional elevation taken on the line 2—2 in FIG. 1.
Figure 3:
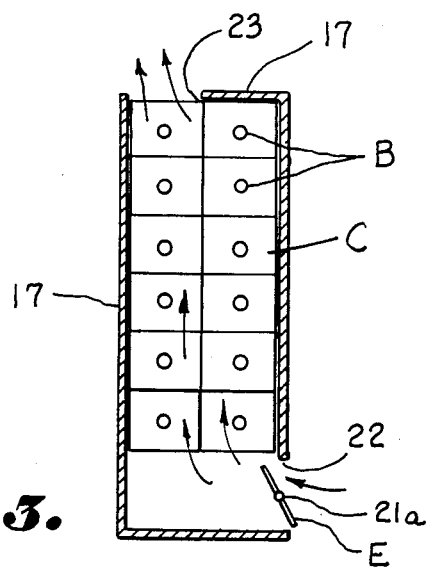
FIG. 3 is a transverse sectional elevation taken on the line 3—3 in FIG. 1.

The drawings illustrate an apparatus for cooling and removing moisture from compressed air passing from a turbocharger and the like to an intake of a combustion engine. An air duct A connects the turbocharger to the intake of the internal combustion engine. A plurality of heat pipes B extend across the air duct for receiving heat from the compressed air passing through the air duct. A portion of the heat pipes extend from the air duct into a zone C of ambient air external to the air duct for transferring heat received from the compressed air to the ambient air thus cooling the compressed air. A coalescer zone D receives the compressed air after cooling for removing moisture therefrom. Means E including a damper controls air flow in the zone of ambient air over the portion of the heat pipes for controlling the cooling of the compressed air.

The heat exchanger apparatus hereof utilizes closed heat tubes containing freon to transfer heat from the compressed intake air stream to the ambient air remote from the intake air stream. The finned heat tubes are illustrated as being arranged to give maximum cooling and minimum restriction of air flow. By using a closed tube, the usual dangers of leakage of engine coolant into the intake are eliminated. Moreover, such a construction may be more compact than prior air to air heat exchangers. Internal clogging or corrosion is not a problem.

Because of the heat exchanger's greater efficiency in lowering the temperature of the intake air stream, water droplets are formed. These water droplets are detrimental to engine fuel efficiency and power output. A coalescer is provided utilizing a wire mesh packing as well as an abrupt change in the direction of air flow. By thus removing these water droplets better fuel efficiency and more power will be produced. Because of ambient conditions, it is not always desirable to cool the compressed intake air to ambient temperatures. Therefore, by placing a thermostat in the intake air after the heat exchanger section and linking it to a damper in the inlet of the ambient air end of the heat exchanger, the temperature of the engine intake air can be controlled to an ideal temperature.

Air is illustrated as passing from a turbocharger 10 which receives exhaust gas as from a diesel engine 11. The engine is illustrated as including a block 11a, a cylinder head 11b and a valve cover 11c. The turbocharger 10 receives exhaust gas from an exhaust manifold 12 carried by the cylinder head 11b. A cross over includes the usual duct 13 communicating on one end with the turbocharger 10 and with an enlarged air duct portion 14 on the other end. The air duct A includes the usual duct 13 and the enlarged air duct portion 14.

A plurality of heat pipes B are illustrated as including the usual tube 15 and spaced transverse heat transfer fins 16 carried thereon. The heat pipes B extend across the enlarged air duct portion 14 as well as a zone C of ambient air. The zone C includes an air duct 17.

A coalescer zone D includes a passageway 18 formed by a lower portion of the enlarged air duct portion 14. Wire mesh packing 19 is carried in the coalescer zone D and collects the water droplets formed by the lowering of the temperatures of the compressed air passing over the heat pipes A.

Means E includes a damper 20 and a sensing and control means therefor in the form of a bimetallic strip 21 (FIG. 1). The damper is illustrated as being pivotally mounted on a pin as at 21a in an inlet passageway 22 in the air duct 17. The damper is controlled by the sensing action of the bimetallic strip which is mounted in the air duct portion 14 and has connection with the pin 21a. An outlet passageway 23 is provided. A drain 24 is provided for determining the moisture collected in the lower portion of the coalescer section.

It is thus seen that heated compressed air passes from the turbocharger and the like across the heat tubes contained in the plenum portion 14 of the duct to a lower coalescer section from whence the conditioned air is passed into the engine. Heat is transferred efficiently and quickly from the heated air to a controlled flow of ambient air passing over a portion of said heat tubes extending externally of the flow path of the heated air in the plenum portion 17 of the ambient zone. A relatively large moisture collecting surface is provided by the wire mesh, and the change of direction of air in the duct resulting from the abrupt change of direction or angle of the duct leading to the engine facilitates collecting of the moisture. Excess moisture is eliminated through the drain 24. The damper 20 is controlled through the operation of the bimetallic strip.

While a preferred embodiment of the invention has been described using specific terms, such description is for illustrative purposes only, and it is to be understood that changes and variations may be made without departing from the spirit or scope of the following claims.

What is claimed is:

1. Apparatus for cooling and removing moisture from compressed air passing from a turbocharger and the like to an intake of an engine comprising:
    an air duct connecting the turbocharger to the intake of the engine;
    a plurality of heat pipes extending across said air duct for receiving heat from said compressed air passing through said air duct;
    a portion of said heat pipes extending from said air duct into a zone of ambient air external to said air duct for transferring heat received from said compressed air to said ambient air thus cooling said compressed air; and
    a lower extension of said air duct forming a coalescer zone receiving said compressed air after cooling by said heat pipes extending across said air duct for removing moisture therefrom.

2. The structure set forth in claim 1 including a damper controlling air flow in said zone of ambient air over said portion of said heat pipes for controlling the cooling of said compressed air.

3. The structure set forth in claim 2 including temperature sensing means in said compressed air stream after cooling, and means operating said damper responsive to said sensing means.

4. The structure set forth in claim 1 wherein said coalescer zone includes metallic mesh for receiving moisture from said compressed air passing through said coalescer zone, and a section at an abrupt angle to said duct conveying compressed air from said duct to said air intake.

5. Apparatus for cooling compressed air passing from a turbocharger and the like to an intake of an engine comprising:
    an air duct connecting the turbocharger to the intake of the engine;
    a plurality of heat pipes extending across said air duct for receiving heat from said compressed air passing through said air duct;
    a zone of ambient air external to said air duct for receiving heat received from said compressed air to said ambient air thus cooling said compressed air; and
    a portion of said heat pipes extending from said air duct into said zone of ambient air.

6. The structure set forth in claim 5 including a damper controlling air flow in said zone of ambient air over said portion of said heat pipes for controlling the cooling of said compressed air.

7. The method of cooling and removing moisture from compressed air passing from a turbocharger and the like to an intake of an engine comprising the steps of:
    connecting the turbocharger to the intake of the engine;
    arranging a plurality of heat pipes across said compressed air collecting heat from the compressed air;
    extending a portion of the heat pipes from said compressed air into a zone of ambient air external to the compressed air for transferring heat received from said compressed over air to the ambient air thus cooling said compressed air; and
    receiving the compressed air in a coalescer zone after cooling for removing moisture therefrom.

8. The method set forth in claim 7 including, controlling air flow in the zone of ambient air over said portion of said heat pipes for controlling the cooling of said compressed air.

9. The method set forth in claim 8 including changing the direction of flow of said compressed air in said coalescer zone for collecting and discharging moisture.

10. Apparatus for removing moisture from compressed air passing from a turbocharger and the like to an intake of an engine comprising:
    an air duct connecting the turbocharger to the intake of the engine;
    a coalescer zone receiving said compressed air in said air duct for removing moisture therefrom;
    said coalescer zone including metallic mesh for receiving moisture from said compressed air passing through said coalescer zone;
    said coalescer zone including a section at an abrupt angle to said duct containing said metallic mesh and conveying compressed air from said duct to said intake; and
    a drain in said section beneath said metallic mesh for discharging moisture removed in said coalescer zone.

11. The structure set forth in claim 10 including cooling means reducing the temperature of the compressed air in the air duct ahead of said coalescer zone.

* * * * *